(12) United States Patent
Zaides et al.

(10) Patent No.: US 12,507,940 B2
(45) Date of Patent: Dec. 30, 2025

(54) LAYERED MULTI-ACTIVATION LOCAL ACTIVATION TIMES (LAT) MAPPING

(71) Applicant: BIOSENSE WEBSTER (ISRAEL) LTD., Yokneam (IL)

(72) Inventors: Leonid Zaides, Atlit (IL); Elad Nakar, Timrat (IL); Eliyahu Ravuna, Kiryat Ata (IL); Yoav Benaroya, Kfar Saba (IL); Refael Itah, Tel Aviv (IL)

(73) Assignee: Biosense Webster (Israel) Ltd., Yokneam (IL)

( * ) Notice: Subject to any disclaimer, the term of this patent is extended or adjusted under 35 U.S.C. 154(b) by 0 days.

(21) Appl. No.: 17/379,200

(22) Filed: Jul. 19, 2021

(65) Prior Publication Data

US 2023/0020372 A1  Jan. 19, 2023

(51) Int. Cl.
- *A61B 5/316* (2021.01)
- *A61B 5/00* (2006.01)
- *A61B 5/367* (2021.01)

(52) U.S. Cl.
CPC ............ *A61B 5/367* (2021.01); *A61B 5/6852* (2013.01); *A61B 5/743* (2013.01); *A61B 2560/02* (2013.01)

(58) Field of Classification Search
CPC .......................... A61B 5/339; A61B 18/1492
See application file for complete search history.

(56) References Cited

U.S. PATENT DOCUMENTS

| | | | |
|---|---|---|---|
| 8,456,182 B2 | 6/2013 | Bar-Tal | |
| 2009/0069704 A1* | 3/2009 | MacAdam | G06T 7/0012 600/523 |
| 2011/0144510 A1 | 6/2011 | Ryu | |
| 2012/0157822 A1 | 6/2012 | van Dam | |
| 2014/0336518 A1* | 11/2014 | Shuros | A61B 5/6858 600/509 |
| 2016/0073913 A1* | 3/2016 | Francis | A61B 5/743 600/512 |
| 2016/0106376 A1 | 4/2016 | Li | |
| 2017/0011197 A1* | 1/2017 | van Dam | G16Z 99/00 |
| 2017/0221254 A1* | 8/2017 | Zar | G06T 15/005 |
| 2019/0261876 A1* | 8/2019 | Ghosh | A61B 5/1107 |

OTHER PUBLICATIONS

European Search report for corresponding EPA No. 22185378.1 dated Nov. 30, 2022.
Ziad F. Issa et al: "Mapping and Navigation Modalities" In: "Clinical Arrhythmology and Electrophysiology", Jan. 1, 2009, Elsevier, XP055585422.

* cited by examiner

*Primary Examiner* — Michael J D'Abreu
(74) *Attorney, Agent, or Firm* — Scully, Scott, Murphy & Pressser, P.C.

(57) ABSTRACT

A method includes receiving a plurality of data points including electrical activation (EA) values measured at respective positions in at least a portion of a surface of a cardiac chamber of a heart of a patient. Using a predefined EA value criterion, the EA values in a given region of the cardiac surface are classified into multiple distinct EA wave-fronts, and multiple layers of EA values are calculated for the given region, wherein each EA layer includes the EA values found to belong to a respective and contiguous EA wave-front. The multiple EA layers are overlayed on a graphical representation of the surface. The graphical representation with the multiple overlaid EA layers is displayed to a user, with a graphical indication distinguishing between the multiple EA layers.

24 Claims, 4 Drawing Sheets

LAYERED MULTI-ACTIVATION LOCAL ACTIVATION TIMES (LAT) MAPPING

FIELD OF THE INVENTION

The present invention relates generally to electrophysiological mapping, and particularly to generation and visualization of cardiac electrical activation maps.

BACKGROUND OF THE INVENTION

Various kinds of electrical activation (EA) cardiac mapping methods have been previously proposed in the patent literature. For example, U.S. Patent Application Publication No. 2016/0106376 describes computing the local conduction velocity of a cardiac activation wavefront by collecting a plurality of electrophysiology ("EP") data points using a multi-electrode catheter, with each EP data point including both position data and local activation time ("LAT") data. For any EP data point, a neighborhood of EP data points, including the selected EP data point and at least two additional EP data points, can be defined. Planes of position and LATs can then be defined using the positions and LATs, respectively, of the EP data points within the neighborhood. A conduction velocity can be computed from an intersection of the planes of positions and LATs. The resultant plurality of conduction velocities can be output as a graphical representation (e.g., an electrophysiology map), for example by displaying vector icons arranged in a uniform grid over a three-dimensional cardiac model.

SUMMARY OF THE INVENTION

An embodiment of the present invention provides a method including receiving a plurality of data points including electrical activation (EA) values measured at respective positions in at least a portion of a surface of a cardiac chamber of a heart of a patient. Using a predefined EA value criterion, the EA values in a given region of the cardiac surface are classified into multiple distinct EA wave-fronts, and multiple layers of EA values are calculated for the given region, wherein each EA layer includes the EA values found to belong to a respective and contiguous EA wave-front. The multiple EA layers are overlayed on a graphical representation of the surface. The graphical representation with the multiple overlaid EA layers is displayed to a user, with a graphical indication distinguishing between the multiple EA layers.

In some embodiments, calculating the multiple EA layers includes generating multiple graphs from the EA values, each graph corresponding to a respective EA layer, and assigning each of the EA values to one of the graphs using a graph connectivity criterion.

In some embodiments, the predefined graph connectivity criterion specifies a maximal wave-front propagation slowness.

In an embodiment, the method further includes interpolating over the EA values within each of the graphs.

In another embodiment, displaying the graphical representation includes displaying the interpolated graphs using color-coded scale.

In some embodiments, the predefined EA value criterion specifies a minimum absolute value difference between adjacent LAT values.

In some embodiments, calculating the multiple EA layers includes applying a voxel connectivity geometry algorithm.

In an embodiment, displaying the graphical representation includes displaying the multiple EA layers in an overlay order set according to the predefined EP value criterion. In another embodiment, displaying the graphical representation includes displaying each EA layer with a different color.

In some embodiments, the EA values are local activation time (LAT) values.

In some embodiments, the region includes a polygon in a polygonal mesh that models the surface.

In an embodiment, receiving the EA values includes acquiring the EA values using a catheter.

There is additionally provided, in accordance with an embodiment of the present invention a system including an interface and a processor. The interface is configured to receive a plurality of data points including electrical activation (EA) values measured at respective positions in at least a portion of a surface of a cardiac chamber of a heart of a patient. The processor is configured to (i) using a predefined EA value criterion, classify the EA values in a given region of the cardiac surface into multiple distinct EA wave-fronts, and calculating multiple layers of EA values for the given region, wherein each EA layer includes the EA values found to belong to a respective and contiguous EA wave-front, (ii) overlay the multiple EA layers on a graphical representation of the surface, and (iii) display the graphical representation with the multiple overlaid EA layers to a user, with a graphical indication distinguishing between the multiple EA layers.

BRIEF DESCRIPTION OF THE DRAWINGS

The present invention will be more fully understood from the following detailed description of the embodiments thereof, taken together with the drawings in which.

DETAILED DESCRIPTION OF EMBODIMENTS

Overview

Figure 1:
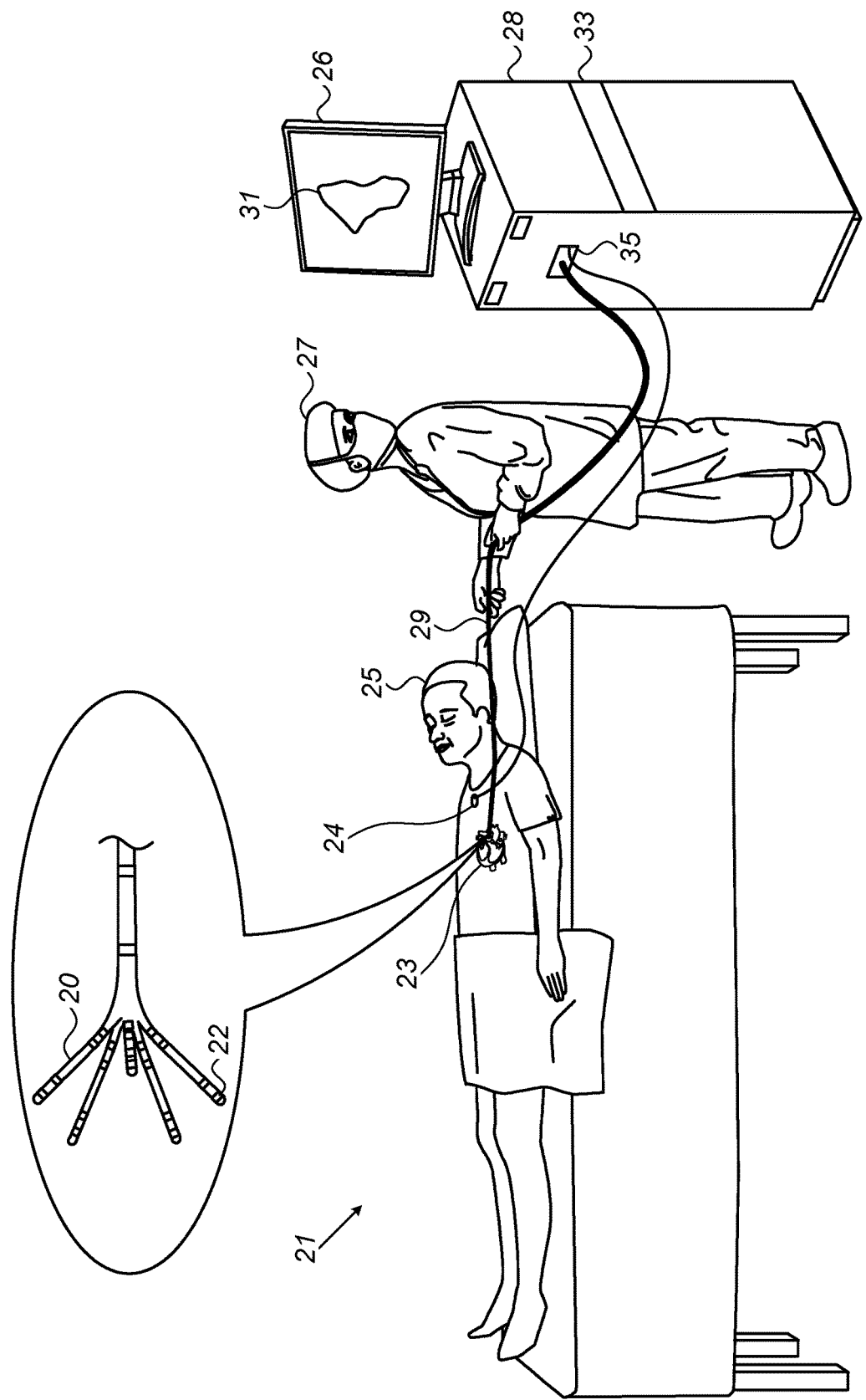
FIG. 1 is a schematic, pictorial illustration of a system for electrical activation (EA) mapping, in accordance with an exemplary embodiment of the present invention.

Catheter-based Electrical Activation (EA) mapping techniques may produce various types of EA maps of an organ, such as an atrium of a heart. Cardiac EA maps, such as a local activation time (LAT) map, a bipolar potential map, or a unipolar potential map, can be produced by acquiring electrograms at multiple locations on the surface of a cardiac chamber (e.g., atrium). Electrical activation values, such as LATs (or potentials), can then be derived from the electrograms for the respective locations. Such locations and respective EA values, called hereafter "data points," may then be overlaid, e.g., by color, onto a 3D map of the chamber.

However, the above-described EA maps do not have the ability to display multiple EA values (e.g., an early LAT and a late LAT) for the same location. At present, when both an early LAT and a late LAT are recorded at the same location, or at nearby locations, the solution is either to interpolate the values or to draw a line of blockage. The former may produce invalid LAT coloring and, as a result, an invalid inference of propagation direction. The latter often produces visual artifacts by showing an incorrect line of blockage over an area of interest.

Embodiments of the present invention that are described herein provide improved methods and systems for generating and visualizing EA maps. In particular, embodiments of the present invention that are described hereinafter take into account the chamber walls to have a thickness, so that activations may occur in different layers of the wall. Additionally, some embodiments take into account that several data points may be acquired in the same region but captured at different times during mapping.

The disclosed techniques calculate, for at least a region of the surface of a cardiac chamber, two or more distinct layers of EA values. For example, in cases where early and late LATs occur, two layers are formed: one layer for the early LATs, and a second layer for the late LATs. The information is visualized by a map in which there is no interpolation between the layers. In addition, any local "jump" in LAT values between layers can be shown. This technique reduces the amount of unnecessary interpolation between LATs, and also gives a clear visual delineation of EA blockage (e.g., scar) regions.

One very useful tool for a physician would be the identification of areas of slow conduction (i.e., slowly propagating EA wave-front) on the reconstructed map. When using a conventional, single-layer LAT map, this is typically done by velocity measurements (discretely by using isochronal display or creating a velocity map by computing LAT derivatives). In complex arrhythmias, where it is common to have more than one group of points in a locality with highly different LAT values, the disclosed method uses a propagation slowness criterion to differentiate between normal conduction, slow conduction, and blockage, by generating and visualizing different EA layers. Thus, the velocity (or the isochronal lines) produced with this method are typically cleaner and more accurate.

In an exemplary embodiment, a processor receives a plurality of data points comprising EA values measured at respective positions in at least a portion of an organ of a patient, such as in a cardiac chamber. The processor generates two or more graphs from the LAT values, using a predefined graph connectivity criterion. The processor subsequently generates a respective activation layer from each graph according to a predefined LAT value criterion. The processor overlays the two or more activation layers on a modeled surface of the cardiac chamber. Finally, the processor displays the overlayed surface to a user with a graphical indication that distinguishes between the activation layers.

Typically, the multiple activation layers are defined according to the predefined LAT value criterion, such as having one layer visualize normal LAT values, and another layer visualize abnormal (late) LAT values.

In an exemplary embodiment, the predefined graph connectivity criterion specifies a maximal propagation slowness, and the predefined LAT value criterion specifies a minimum difference between EP values.

In some exemplary embodiments, within each graph, the processor interpolates over EA values of each EA layer (e.g., linearly interpolates between LAT values) to generate continuous (contiguous) color-coded regions. Furthermore, video representations may also be generated, such as a cardiac activation propagation map that shows the separate conduction patterns in the EA layers. In such a presentation, slower EA signal propagation can be shown in one layer, while, at the same time, normal EA signal propagation can be shown in another layer.

In one exemplary embodiment, a dynamic (video) propagation mode is provided, to show the EA propagation to a user on a display. The two EA layers separate earlier LAT values from later LAT values (theoretically, there might be several layers of earlier-later LAT values). The wavefront velocity in each layer (or isochronal crowding) can be faster or slower than that of the other layers. Moreover, the video can show (i) propagation in each EA layer and line blocks between the EA layers, (ii) how a wave may activate a region more than one time, and (iii) how the two activations relate to each other considering the full chamber activation.

The disclosed layered EA maps (whether static or time-varying using video) can be correlated with, for example, a bipolar potential map, so as to carefully determine regions that require ablation.

By providing a multilayered EA map, the disclosed techniques assist physicians in the interpretation of EA information and thus expedite and improve the quality of complicated diagnostic tasks, such as those required in diagnostic catheterizations. Moreover, the disclosed technique may reduce the amount of ablation, while retaining clinical effectiveness in treating arrhythmia using ablation, thereby reducing side effects and hazards to the patient.

System Description

FIG. 1 is a schematic, pictorial illustration of a system 21 for electrical activation (EA) mapping, in accordance with an exemplary embodiment of the present invention. FIG. 1 depicts a physician 27 using a typical mapping catheter, such as the Pentaray® 29 to perform an EA mapping of a heart 23 of a patient 25. Catheter 29 comprises, at its distal end, typically one or more arms 20, which may be mechanically flexible, each of which is coupled with one or more electrodes 22. During the mapping procedure, electrodes 22 acquire unipolar and/or bipolar signals from and/or to the tissue of heart 23. A processor 28 receives these signals via an electrical interface 35, and uses information contained in these signals to construct an EA map 31 stored by processor 28 in a memory 33. During and/or following the procedure, processor 28 may display EA map 31 on a display 26.

EA map 31 may be an LAT map, a bipolar potential map, or another map type. EA map 31 has an improved quality using the disclosed technique to derive and present different EA values, such as different LAT values, on spatially overlapping regions on the map, as described in FIG. 2 and FIG. 3.

During the procedure, a tracking system is used to track the respective locations of sensing electrodes 22, such that each of the signals may be associated with the location at which the signal was acquired. For example, the Active Catheter Location (ACL) system, made by Biosense-Webster (Irvine California), which is described in U.S. Pat. No. 8,456,182, whose disclosure is incorporated herein by reference, may be used. In the ACL system, a processor estimates the respective locations of the electrodes based on impedances measured between each of the sensing-electrodes 22, and a plurality of surface electrodes 24 that are coupled to the skin of patient 25. For example, three surface electrodes 24 may be coupled to the patient's chest and another three surface electrodes may be coupled to the patient's back. (For ease of illustration, only one surface electrode is shown in FIG. 1.) Electric currents are passed between electrodes 22 inside heart 23 of the patient and surface-electrodes 24. Processor 28 calculates an estimated location of all electrodes 22 within the patient's heart based on the ratios between the resulting current amplitudes measured at surface electrodes 24 (or between the impedances implied by these amplitudes) and the known positions of electrodes 24 on the patient's body. The processor may thus associate any given impedance signal received from electrodes 22 with the location at which the signal was acquired.

The example illustration shown in FIG. 1 is chosen purely for the sake of conceptual clarity. Other tracking methods can be used, such as ones based on measuring voltage signals. Other types of sensing catheters, such as the Lasso® Catheter (produced by Biosense Webster) or basket catheters may equivalently be employed. Physical contact sensors may be fitted at the distal end of mapping catheter 29 to estimate contact quality between each of the electrodes 22 and an inner surface of the cardiac chamber during measurement.

Processor 28 typically comprises a general-purpose computer with software programmed to carry out the functions described herein. In particular, processor 28 runs a dedicated algorithm as disclosed herein, including in FIG. 3, that enables processor 28 to perform the disclosed steps, as further described below. The software may be downloaded to the computer in electronic form, over a network, for example, or it may, alternatively or additionally, be provided and/or stored on non-transitory tangible media, such as magnetic, optical, or electronic memory.

Layered LAT Map to Differentiate Slow Conduction From Blockage

Figure 2:
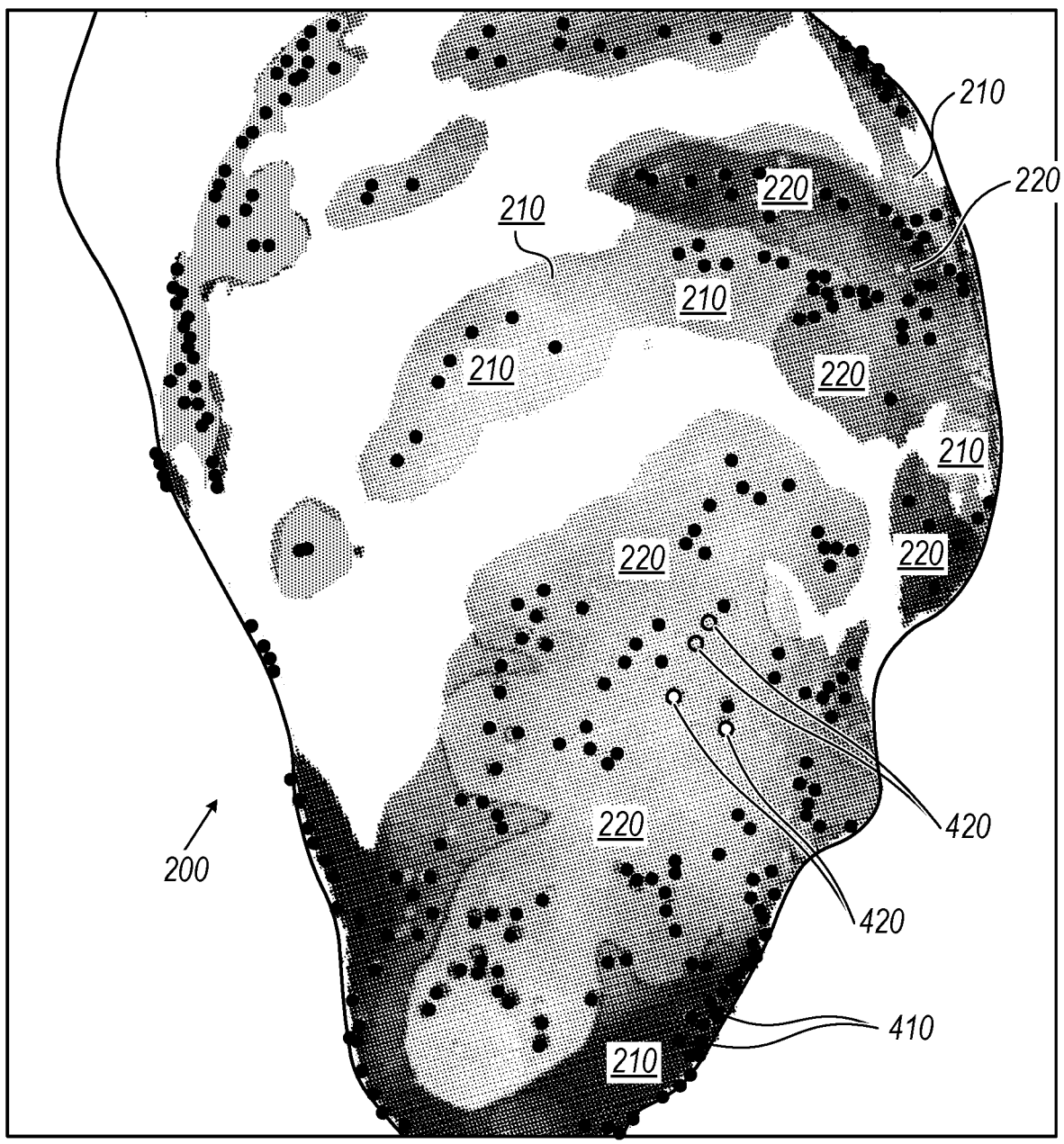
FIG. 2 is a schematic, pictorial rendering of an EA map of a surface of a left ventricle comprising two activation layers, in accordance with an exemplary embodiment of the present invention.

FIG. 2 is a schematic, pictorial rendering of an EA map 200 of a surface of a left ventricle comprising two EA layers 210 and 220, in accordance with an exemplary embodiment of the present invention. EP map 200 may be produced and displayed, for example, by processor 28 of system 21.

In the present example, EA layers 210 and 220 are an early LAT layer and late LAT layer, respectively. The layers are derived using an algorithm described in FIG. 3 below. In some embodiments, the two LAT layers 210 and 220 partially overlap, e.g., in regions where the measurements of two LAT values differ by more than a predefined minimal LAT value. In such a case a first set of smaller LAT values is used to generate layer 210 and a second set of larger LAT values is used to generate layer 220, as defined in the algorithm description below.

To differentiate EA layer 220 from 210, processor 28 may display the layers with distinct graphical indications, such as using different colors or grey levels (as shown) or using patterns (not shown).

LAT layers 210 and 220 may be overlaid in ascending or descending order according to their captured LAT range. For example, smaller LAT values can be assigned to layer 210, indicating normal tissue portions. Larger LAT values, which may indicate abnormal tissue, are shown under layer 220. By presenting the LAT information in this way, the disclosed technique may increase clinical usefulness of the map, for example, by identifying scar tissue, as described above.

Further seen in FIG. 2 are the acquired LAT values themselves, denoted 410 and 420, from which processor 28 generates respective layer representations 210 and 220, e.g., by interpolation. A user may choose whether or not to display LAT values 410 and 420 and their value data points (tissue positions and LAT values). Note, the graphical presentation of LAT values 410 and 420 on the EA map is not part of the disclosed algorithm, and LAT values 410 and 420 are not separated into layers. The showing of these elements is therefore left for user discretion, to provide the user with additional, rawer, representation of the acquired data.

FIG. 2 is brought purely by way of example to describe the disclosed concept. Other suitable types of maps having multiple EA layers may be constructed in alternative embodiments.

Furthermore, processor 28 may generate a time-varying multi-layer EA map, e.g., using a video representation. A time-varying representation can be used, for example, to display a cardiac activation propagation map that shows the separate conduction patterns in layers 210 and 220, with slower EA signal propagation shown in a layer equivalent of layer 220, while at the same time normal EA signal propagation is shown in a layer equivalent of layer 210.

Figure 3:
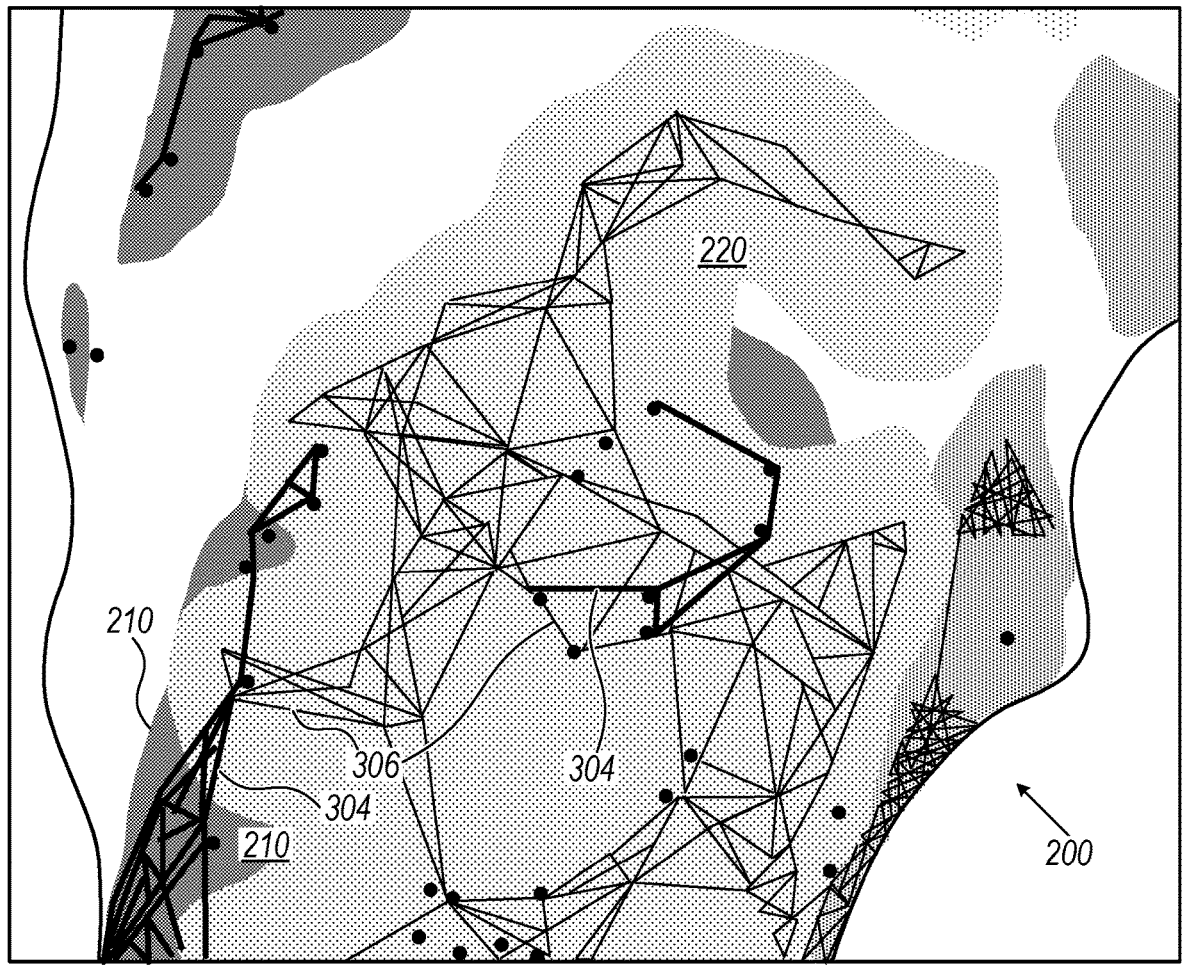
FIG. 3 is a schematic, pictorial volume rendering showing the generation of the EA map of FIG. 2 based on EA graph families, in accordance with an exemplary embodiment of the present invention.

Algorithm for Generating Layered LAT Map to Differentiate Slow Conduction from Blockage FIG. 3 is a schematic, pictorial surface rendering showing the generation of EA map 200 of FIG. 2 by processor 28, based on EA graph families, in accordance with an exemplary embodiment of the present invention.

As seen in FIG. 3, in some embodiments processor 28 divides the regional LAT points into two different graph families 304 and 306, using an LAT value difference criterion, which for LAT values means that $LAT_i$ and $LAT_j$ belong to different (i.e., disconnected graph families) if $$|LAT_i - LAT_j| > LAT_0, \quad \text{Eq. 1}$$

where $LAT_0$ is the LAT value threshold, also called hereinafter a minimum absolute LAT value difference.

Graphs of graph families 304 and 306 may overlap on the map, but still, graph families 304 and 306 are not interconnected (as no EA conduction can occur between data point of a graph 304 and those of a graph 306).

Each of graph families 304 and 306 represent a valid EA conduction path (i.e., valid EA wave-front), whether normal or abnormal. In order to generate separate graph families 304 and 306 using the disclosed algorithm, processor 28 determines between which LAT points EA conduction can occur, and between which LAT points conduction cannot occur. LAT points identified as having a conduction path between them are assigned to the same EA layer.

To determine whether two given LAT points are connected by an EA conduction path (and therefore should belong to the same graph family and the same EA layer), processor 28 calculates the conduction velocity between the two points:

$$V_{ij} = \frac{L_{ij}}{|LAT_i - LAT_j|} = \frac{L_{ij}}{|\Delta T_{ij}|} \quad \text{Eq. 2}$$

where $L_{ij}$ is the path length (either geodesic or Euclidian) between the data points and $\Delta T_{ij}$ is the time difference between arrival of the LAT signal at tissue positions i and j. The inverse of $V_{ij}$ is referred to as propagation slowness.

Processor 28 determines whether positions i and j are connected by an EA conduction path, by comparing $V_{ij}$ to a predefined velocity value $V_0$ (also called "EA block threshold"). When $V_{ij} < V_0$ (i.e., for propagation slowness being above a maximum predefined value) the processor determines there is no propagation (normal or slow) between the two tissue positions i and j. Processor 28 assigns such points to different graph families and thus to different EA layers. If, on the other hand, $V_{ij} \geq V_0$, processor 28 assigns points i and j to the same graph family and thus to the same EA layer. This criterion is referred to herein as a graph connectivity criterion.

Starting from any of one or more tissue positions, the processor generates graph families 304 and 306 at the same time by applying criterion of Eq. 1 to each neighboring LAT value and aggregating (e.g., assigning) the EA values to each graph family accordingly.

Next, the processor projects the graphs onto a modeled surface of the cavity (e.g., onto an anatomical map).

To generate the EA layers of FIG. 3, in some embodiments processor 28 applies thus the EA value criterion (e.g., LAT value criterion) of Eq. 1. As noted above, the processor may aggregate the separate graph families 304 and 306 according to meeting a minimal EA value difference between EA values of graphs, for example, if the minimal LAT absolute value difference for any LAT value in the graphs is above a threshold LAT difference $EA_0 = \Delta LAT$.

Per each graph family, the processor applies color-coded LAT values, and interpolates over the voxels to generate the color graduations (e.g., shades) in each of layers 210 and 220 above. As seen, different graph families 304 and 306 receive different colors so as not to mix between layers 210 and 220 that are subsequently differentiated according to the threshold LAT difference $\Delta LAT$ criterion.

Figure 4:
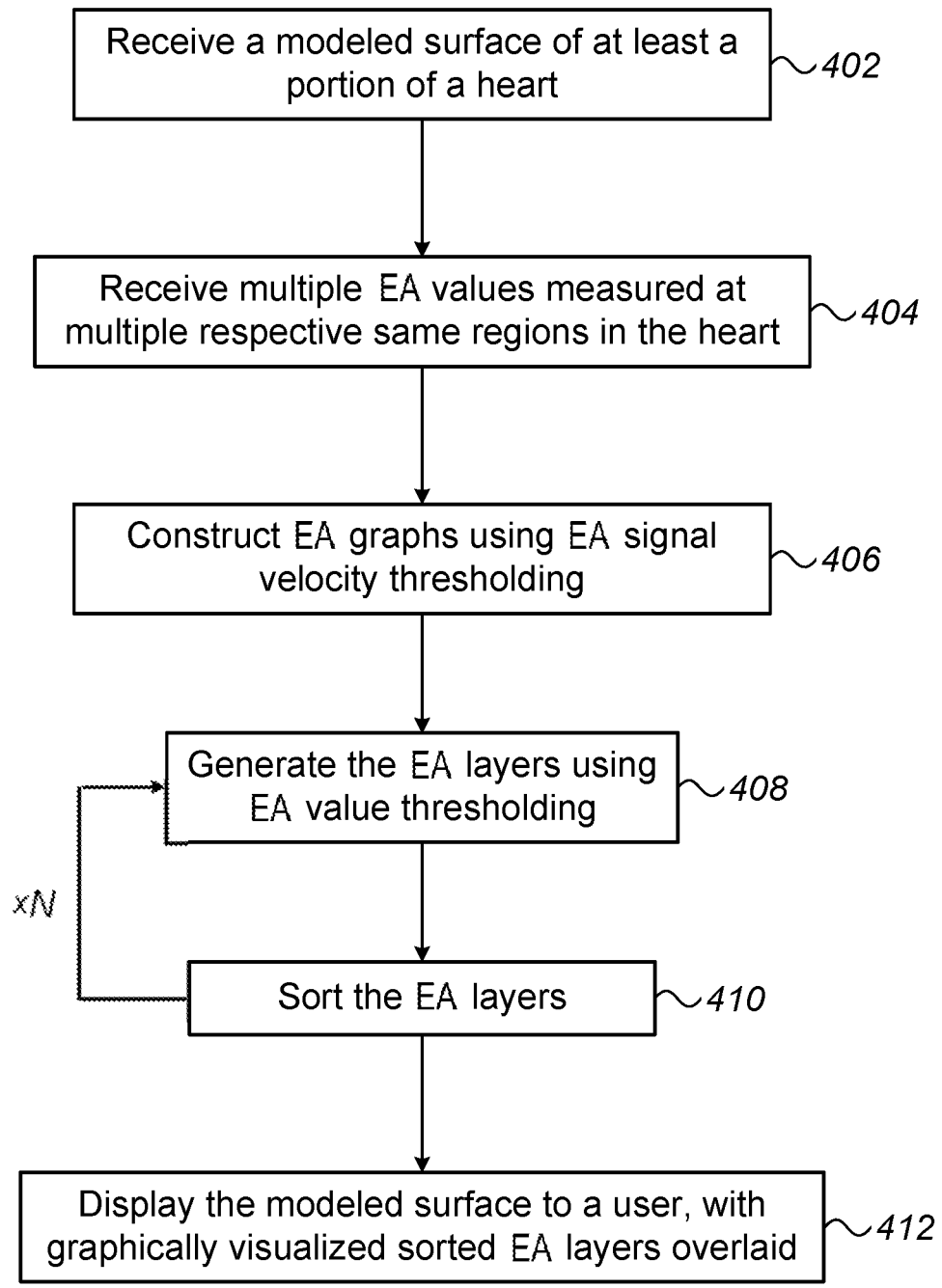
FIG. 4 is a flow chart that schematically illustrates a method for generating the multi-layer EA map of FIG. 2, in accordance with an exemplary embodiment of the present invention.

Method for Generating Layered LAT Map to Differentiate Slow Conduction from Blockage FIG. 4 is a flow chart that schematically illustrates a method for generating multi-layer EA map 200 of FIG. 2, in accordance with an exemplary embodiment of the present invention. The algorithm, according to the presented embodiment, carries out a process that begins with processor 28 receiving a modeled surface (e.g., an anatomical map) of at least a portion of a heart, at a model receiving step 402.

At a data points receiving step 404, the processor receives multiple data points comprising EA values, such as LAT values, measured at multiple respective locations associated with the modeled surface. Step 404 may include acquiring electrograms using a multi-electrode catheter and processor 28 analyzing electrograms to derive EA values, such as LAT values.

Next, at an EA graph construction step 406, processor 28 applies the above-described graph generation algorithm to assign EA values with the same or different graph family (such as graphs 304 and 306) at each region using a graph connectivity criterion based on the minimal EA signal velocity (called herein EA velocity thresholding).

At an EA layers generation step 408, processor 28 applies the above-described algorithm to generate the EA layers, such as LAT layers 210 and 220, using LAT value difference thresholding of Eq. 1. In particular, in an embodiment, the processor linearly interpolates over the EA values within each of the graphs (e.g., performs linear interpolation between nodes).

At an EA layer sorting step 410, processor 28 sorts the layer according to, for example, a user request to show layers generated from later LAT values on top of a layer generated from the earlier LAT values (e.g., show potentially abnormal tissue overlayed on top of potentially normal tissue).

As seen, the execution of steps 408-410 in FIG. 4 is an iterative process. Because the graphs are typically sparse, and the maps are colored based on the graph lines, there is a need to propagate the values form the lines. Thus, for each such step (the number of N steps is predefined), the processor propagates the layer values to the nearest voxels of the map, generate EA layers (408) and then sort again the EA layer (410).

At an EA map presentation step 412, processor 28 displays the modeled surface with the sorted EA layers overlayed.

The example flow chart shown in FIG. 4 is chosen purely for the sake of conceptual clarity. In optional embodiments, various additional steps may be performed, for example to automatically register additional layers, such as of medical images, and to generate a display that can toggle among all layers.

Layered Multi Activation LAT Map for Voxel Geometry

In this section, alternative description of some embodiments of the invention is provided in terms of voxels. The disclosed description shows how to interpolate only between voxels with EA values belonging to a same set of data points (based on a threshold that separates between voxels of different EA layers).

The disclosed description details an algorithm for the layering of different EA values, such as LAT values, activated at a same specific voxel, based on the LAT value threshold.

The LAT layer values recorded at each voxel are estimated using closest data points. Then, a processor transforms normalized LAT values to half circle LAT values to display in an unambiguous way the different layers overlayed on a surface rendering.

The algorithm begins with defining two arrays for each voxel: latLayers—array of LATs, latDists—array of distances.

The processor defines a counter of layers, numLayers on each voxel.

All values initialized to zero.

Parameters to algorithm are:

LAT value criterion, also called herein, LAT layer threshold—the threshold that separates LAT values to different layers.

Color distance—a maximal distance to a projected point from a location.

Generating the Layers on Voxels:

The processor generates the different LAT layers on each voxel by performing the following steps 1-5:

1) For each voxel, v: Each time a point _p is projected to _v, the processoer calculates: _v.latLayers[_v.numLayers]=p.lat, _v.numLayers+=1

2) When all points are projected, for each voxel _v, the processor sorts the array and remove the redundant layers.

3) Next the processor propagates the LAT values to neighbor voxels.

In one case, for each voxel, _v, this is done in a separate kernel on GPU.

The processor further generates each layer by traversing the array of voxels, meaning for each v traverse a given number of neighbors of _v, the processor collects all the layered LATs and layered distances, and put them in respective arrays tempLats, tempDistances. The step of applying layering to neighbors occurs several times (predefined number of steps), as further shown in steps 408-410 of FIG. 4.

The tempDistances is updated by taking the distance of the neighbor to origin (voxel with projected point)+distance from _v to the neighbor.

Then, the processor adds to tempLats and tempDistances _v.latLayers and _v.latDists.

The processor sorts the arrays and remove redundant layer, update the number of layers left, and copies the data to _v.latLayers, _v.latDists and update _v.numLayers.

4) Next the processor smooths the LAT values with Laplace operator.

For Each Voxel _v

The processor takes a predefined number of the lateral neighbors of _v. For each layer in v, the processor finds layers of the neighbors whose LAT difference to the layer of _v less than LAT layer threshold.

Then, the processor updates the layer of _v from the found LAT values.

The uses a function called herein SortContractLayers (array of lats, array of distances, layer lat threshold), to sort and removes redundant layers. The outputs are arrays of lats and corresponding distances.

Each remaining array of LAT values doesn't include two LAT values that the difference between them is more than the LAT layer LAT separation threshold, meaning these are separate EA layers, with no EA propagation allowed between. In other words, the returned arrays for each voxels comprise the EA layers and respective LAT distances. The LAT values in the layers array must be greater than the LAT layer threshold.

SortContractLayers Function Outline:
  Sort the arrays in the following manner:
  for each index _i and _j:
    if abs(LAT(_i)-LAT(_j))<layer threshold sort _i, _j by their distance values.
    If abs(LAT(_i)-LAT(_j))>layer threshold sort _i, _j by their LAT values.
  Traverse the LAT array and mark index _i to delete if abs(LAT(_i)-LAT(_i-1))<LAT layer threshold.
  Remove items from LAT and distances arrays whose indices are marked to delete.
  Contract the array and return the number of items in the array.
  The function returns array of LAT values and distances that the difference between the items in LAT array values greater than layer LAT threshold and the distance to origin for each item is minimal.

5) Extend values of voxels with layers to all the neighbors in a manner similar to step (3). This step is required for trilinear interpolation.

Displaying LAT Layers of Voxels

The display is separated into static display of the map, where the processor or a user selects which layer to display on each pixel and propagation where on the surface to show a layer based on the propagation LAT value at each time.

Static Display:

The options that can be chosen to display for LAT values are: earliest and latest, and we also can provide a range of visible LAT values.

The Algorithm:
  1) For each position on the geometry, find the 8 voxels participating in trilinear interpolation. The positions of these voxels represent a cube. The LAT value inside this cube is defined by the interpolation factor derived from the proximity to the 8 vertices of the cube (these are the positions to the voxels).

2) Traverse the LAT layers of the 8 voxels and find all the LAT values that may affect the interpolated LAT inside the cube. Push those values inside TargetLat array.

The LAT values that may affect the outcome are layers whose LAT distance<color distance.

3) Traverse the TargetLat array, remove repeating values and contract it. LAT value _LK is repeating if there is another LAT value _LI for which abs (_LI-LK)<layer LAT threshold.

4) Sort and clamp the TargetLat array.
    If the option to display is 'latest' the processor sorts descending.
    If the option to display is 'earliest' the processor sorts ascending.
    If a range is provided, the processor removes from the TargetLat array LAT values that are outside it.

5) For each of the 8 voxels the processor allocates (statically) two more arrays whose size should be the size of TargetLat. The arrays are for lats and for distances: voxelTargetLat, voxelTargetDist.

6) For each of the layers of the 8 voxels, traverse the TargetLat array and test whether the LAT in target Lat and the LAT in the voxel's current layer match (their difference less than layer LAT threshold).
    If it matches: voxelTargetLat[i_target]=voxel.latLayers[i_layer] and voxelTargetDist[i_target]=voxel.latDists[i_layer].

7) Trilinear interpolation of LAT and distance values for each layer (these are per pixel values).

8) The processor traverses the per pixel layer values.
    If the interpolated distance of a layer<color distance, apply the interpolated layer LAT value.
    Otherwise, proceed to next layer.
    If all layer distances are greater than the color distance threshold, we apply NO COLOR value.

Displaying Propagation

When displaying propagation wave of the LAT values the processor needs to traverse all the layers at some location and highlight the location if layer LAT matches propagation LAT. Because, by construction the layers hold variable values and not fixed values (the LAT layer values are not fixed, rather determined by the differences in LAT in that location). For example, in 1D, a voxel can have 2 layers with LAT values: [LAT1, LAT2], while an adjacent voxel has only one layer with LAT value [LAT3], LAT3≈LAT2. If the distances of the layers are Less than color distance, all LAT values would erroneously participate in propagation.

To prevent this, if the two LAT layers are separated between adjacent voxels, then one of those voxels must be outside the color distance on display. The reason for erroneous interpolation between layers is with using 3D textures. Trilinear interpolation will create erroneous values between layers (layer 0 of some voxel can have value 10, while layer 0 of its neighbor may have 100 thus interpolating between the layers is not correct, but it happens automatically with 3D textures).

As noted above, there is a need to display propagation over the static layer, calculated above, and the 2 layers of the voxels. However, the per-pixel value of LAT is interpolated among the values of adjacent Voxels. i.e., the LAT values of layer 0 in the example between the two voxels will be interpolated (according to distance from the voxels) between LAT1 and LAT2. This will cause to show activations in all LAT values between LAT1 and LAT2 in this area.

To prevent activation on incorrect interpolation the processor identifies the invalid interpolation. It does this by following the steps of:

1) For each voxel, transferring the normalized LAT values (between 0-1) to an upper unit half circle. The transformation is: $x=-\cos(LAT*PI)$, $y=\sin(LAT*PI)$. Thus, for each LAT value there a position on the unit half circle, and its' magnitude is 1. For each interpolated value the magnitude of this vector is less than 1 and decreases with difference in non-interpolated voxel values.

2) For each layer, the processor calculates the distance for interpolated values, and can choose a half-circle threshold, such that LAT values with distances above this threshold are activated and distances below this half-circle threshold are discarded. The threshold should be derived from cycle length. (Propagation is not displayed in this case).

The reason for using half circle is because it handles uniquely differences between LAT values. I.e., It does not dependent on the absolute values, rather the difference between them.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method of catheter based electrical activation mapping, comprising:
    tracking, by a tracking system, electrodes on a catheter positioned at respective cardiac tissue locations in a given region of a surface of a cardiac chamber of a heart of a patient;
    acquiring a plurality of data points from the electrodes, the data points comprising electrical activation (EA) values measured at the respective cardiac tissue locations;
    generating multiple EA graphs by applying a graph connectivity criterion based on EA velocity thresholding, the EA velocity thresholding generating disconnected EA graph families of connected data points and assigning EA values to the disconnected EA graph families, wherein generating disconnected EA graph families comprises starting from one or more cardiac tissue positions and adding neighboring EA data points determined to be connected based on the graph connectivity criterion;
    generating multiple EA layers of disconnected EA graph families by applying EA value difference thresholding to the disconnected EA graph families
    constructing an EA map by aggregating the EA graph families indicating normal tissue in one or more EA layers and aggregating the EA graph families indicating abnormal tissue in one or more EA layers based on the EA value thresholding;
    overlaying the EA map with the multiple EA layers on a modeled surface of the cardiac chamber, with the EA layers indicating abnormal tissue and the EA layers indicating normal tissue partially overlapping each other; and
    displaying the EA map on the modeled surface of the cardiac chamber with the multiple overlaid EA layers to a user, with a graphical indication distinguishing between the EA layers identifying normal tissue and abnormal tissue.

2. The method according to claim 1, further comprising applying a propagation slowness criterion to differentiate EA graph families indicating normal tissue and the EA graph families indicating abnormal tissue.

3. The method according to claim 2, wherein the EA layers indicating abnormal tissue include EA graph families having a propagation velocity between data points below a threshold value.

4. The method according to claim 3, further including generating a time-varying multi-layered EA map showing the propagation velocity of the EA graph families.

5. The method according to claim 1, wherein the graph connectivity criterion specifies a maximal propagation slowness.

6. The method according to claim 1, further comprising interpolating over the EA values within each of the EA graphs.

7. The method according to claim 1, wherein the EA value thresholding specifies a minimum absolute value difference between adjacent LAT values.

8. The method according to claim 1, wherein defining the multiple EA layers comprises applying a voxel connectivity geometry algorithm.

9. The method according to claim 1, wherein displaying the EA map comprises displaying the multiple overlaid EA layers in an overlapping order set according to the EA value thresholding.

10. The method according to claim 1, wherein displaying the EA map comprises displaying each EA layer with a different color.

11. The method according to claim 1, wherein the EA values are local activation time (LAT) values.

12. The method according to claim 1, wherein the given region comprises a polygon in a polygonal mesh that models the surface of the cardiac chamber.

13. A system, comprising:
    a catheter having electrodes positioned at respective cardiac tissue locations in a given region of a surface of a cardiac chamber of a heart of a patient;
    a tracking system for tracking the electrodes at the respective cardiac tissue locations in a given region of a surface of a cardiac chamber of a heart of a patient;
    an interface, which is configured to acquire a plurality of data points from the electrodes, the data points comprising electrical activation (EA) values measured at the respective cardiac tissue locations; and
    a processor, which is configured to perform:
    generating multiple EA graphs by applying a graph connectivity criterion based on EA velocity thresholding, the EA velocity thresholding generating disconnected EA graph families of connected data points and assigning EA values to the disconnected EA graph families, wherein generating disconnected EA graph families comprises starting from one or more cardiac tissue positions and adding neighboring EA data points determined to be connected based on the graph connectivity criterion;
    generating multiple EA layers of disconnected EA graph families by applying EA value difference thresholding to the disconnected EA graph families;
    constructing an EA map by aggregating the EA graph families indicating normal tissue in one or more EA layers and aggregating the EA graph families indicating abnormal tissue in one or more EA layers based on the EA value thresholding;

overlaying the EA map with the multiple EA layers on a modeled surface of the cardiac chamber, with the EA layers indicating abnormal tissue and the EA layers indicating normal tissue partially overlapping each other; and displaying the EA map on the modeled surface of the cardiac chamber with the multiple overlaid EA layers to a user, with a graphical indication distinguishing between the EA layers identifying normal tissue and abnormal tissue.

14. The system according to claim 13, wherein the processor is configured to apply a propagation slowness criterion to differentiate EA graph families indicating normal tissue and the EA graph families indicating abnormal tissue.

15. The system according to claim 14, wherein the EA layers indicating abnormal tissue include EA graph families having a propagation velocity between data points below a threshold value.

16. The system according to claim 15, wherein the processor is configured to generate a time-varying multi-layered EA map showing the propagation velocity of the EA graph families.

17. The system according to claim 13, wherein the graph connectivity criterion specifies a maximal wave-front propagation slowness.

18. The system according to claim 13, the processor is further configured to interpolate over the EA values within each of the EA graphs.

19. The system according to claim 13, wherein the predefined EA value thresholding specifies a minimum absolute value difference between adjacent LAT values.

20. The system according to claim 13, wherein the processor is configured to define the multiple EA layers by applying a voxel connectivity geometry algorithm.

21. The system according to claim 13, wherein the processor is configured to display the EA map by displaying the multiple overlaid EA layers in an overlapping order set according to the predefined EA value thresholding.

22. The system according to claim 13, wherein the processor is configured to display the EA map by displaying each EA layer with a different color.

23. The system according to claim 13, wherein the EA values are local activation time (LAT) values.

24. The system according to claim 13, wherein the given region comprises a polygon in a polygonal mesh that models the surface.

* * * * *